United States Patent [19]

Faehnle

[11] Patent Number: 4,538,528
[45] Date of Patent: Sep. 3, 1985

[54] GAS CONVERTER

[75] Inventor: Erich Faehnle, Aalen, Fed. Rep. of Germany

[73] Assignee: PKA Pyrolyse Kraftanlagen GmbH, Aalen, Fed. Rep. of Germany

[21] Appl. No.: 610,677

[22] Filed: May 16, 1984

[30] Foreign Application Priority Data

May 18, 1983 [DE] Fed. Rep. of Germany ....... 3317977

[51] Int. Cl.³ .............................................. F23K 1/00
[52] U.S. Cl. ...................................... 110/229; 48/77; 48/101; 110/171; 110/256
[58] Field of Search ............... 110/229, 230, 256, 171; 48/76, 77, 101

[56] References Cited

U.S. PATENT DOCUMENTS 2,147,324 2/1939 Van Ackeren ...................... 110/229
2,548,086 4/1951 West et al. ........................... 110/229
4,165,970 8/1979 Rudolph et al. ..................... 48/77 X
4,274,341 6/1981 Ozaltay ............................... 110/229

FOREIGN PATENT DOCUMENTS 113182 2/1918 United Kingdom ............... 110/229

Primary Examiner—Edward G. Favors
Attorney, Agent, or Firm—Walter H. Schneider

[57] ABSTRACT

A gas converter is disclosed, especially for the treatment, including dissociation, of gases produced in the pyrolysis of waste materials. The converter includes a feeder for airtight feeding of fuel from the upper region of the reactor tower to the bed of hot fuel, a gas outlet, and a slag removal system. The reactor tower is furnished at its lower end near the conduits for the admission of air and gases with a rotating distributor member. The feeder is provided by a bucket-wheel valve arrangement.

13 Claims, 8 Drawing Figures

GAS CONVERTER

BACKGROUND OF THE INVENTION

1. Field of the Invention

The present invention relates generally to improvements in or relating to gas converters. More particularly, the present invention is concerned with converters for the treatment and dissociations of gases produced in the pyrolysis of waste material, or in similar thermal treatment operations.

In general, such converters comprise a reactor tower having fuel supply means in the upper region, a gas withdrawal system, a hot fuel bed, usually with coal as the fuel, a slag removal system, and various air and gas conduits.

The pertaining gases can be treated in the gas converter or reactor tower.

This is the case, for example, in the pyrolysis of domestic and industrial wastes, wherein the organic components are degassed and volatilized. The recovered gas is not directly useful and requires additional treatment in a converter.

A mixture comprised of steam, coal dust and gas, all produced in the pyrolysis of waste material, may be obtained from a treatment drum for carrying out the pyrolysis step. The mixture is introduced into the converter through a gas inlet conduit, and air is added substantially simultaneously in a sub-stoichiometric amount. Over a bed of hot fuel, e.g., coal, combustion of entrained carbonaceous matter is carried out, as well as a partial oxidation of the gases. Cracking of long-chain hydrocarbons into methane and hydrogen is achieved at the high temperature of about 1200° C. that is realized in the system. There are also produced minor amounts of carbon dioxide, carbon monoxide, and simple hydrocarbons. In the subsequent dissociation phase the mixture comprised of steam, $CO_2$, $CO$, $H_2$, methane, tar, phenolic residues, and nitrogen, is passed through the hot coal bed, and the subsequent reactions proceed.

The resulting gaseous mixture, comprised of hydrogen, carbon monoxide, short-chain hydrocarbons, the inert gases carbon dioxide and nitrogen, and in smaller quantities, steam and higher hydrocarbons, leave the converter through the gas withdrawal system. The gas is subsequently treated for the removal of entrained dust, and is further treated in a gas cooling and purification system for enduse. Utilization of such gas can be in a gas motor, a gas turbine with a generator for the production of electrical current, and similar equipment. The gas can also be used for heating, as by-pass in boiler operations, or other similar operations, e.g., in the chemical industries as synthesis gas.

2. Description of the Prior Art

The hitherto known gas converters exhibit various disadvantages. Coal or coke was simply fed from the upper region of the converter through the gate system into the interior of the converter. The fuel was added in batches which means that a previous charge would have to be nearly fully used before being replaced by a new charge. However, due to the resulting variations in height of the fuel bed, the efficiency of the converter was affected. Furthermore, the coal bed became conical, which also led to uneven operation of the system in accordance with the prior art.

The slag removal arrangement was comprised of a valve system which would open in timed intervals. However, this method is very inaccurate and led to losses of coal or coke, because control of the opening time could not be maintained very precisely.

The air and gas addition was not always even, which reflected detrimentally on the overall performance.

SUMMARY OF THE INVENTION

There has continued to remain, therefore, a need for improving the gas converters briefly described in the foregoing.

It is an object of the present invention to provide an improved gas converter which exhibits a high efficiency at simple construction and low maintenance requirements, with the operation to be substantially fully automated.

In accordance with the present invention these objects are achieved by a gas converter which includes a rotating distributor member located beneath the hot fuel bed and positioned substantially coincidentally with respect to the main axis of the converter. The distributor member is linked to gas and air conduits, and it is furnished with a plurality of air and gas exit openings and other passages.

The rotating distributor member ensures that air and gas are introduced through the various conduits and are very evenly distributed into the superimposed coal bed. One merely has to take care that the distributor, or distributor member, is made of a material which is resistant to the temperatures experienced in the reactor, or tower. The distributor may be made of a ceramic material, for example, and this could be hard as well.

For a still more improved and more even air/gas mixture distribution, there can be provided in the distributor at least two superimposed rows of air/gas mixture exit openings which are offest with respect to one another when viewed in the circumferential direction.

The air/gas mixture exit openings can terminate into recesses or apertures which are arranged so as to impart to the distributor a star-like configuration when viewed in cross section in plan view.

The problem of driving the distributor under the conditions of the very high temperatures experienced in the reactor has been solved, in accordance with another feature of the invention, thereby that the distributor is furnished with a multiple-sided bore, preferably a hexagonal bore, which is adapted to receive the drive shaft for the distributor. The drive shaft has a correspondingly shaped configuration at its pertaining end in order to be operatively connectible to the distributor. The drive shaft extends from below into the reactor tower, or shell.

Such a design obviates the need for threaded fasteners, or other fasteners, because due to its inherent weight, the distributor is securely positioned on the drive shaft and beneath the coal or coke bed.

A further very advantageous embodiment of the invention resides therein that the center of the hexagonal bore, when viewed in plan view, is positioned eccentrically with respet to the centerline of the distributor member.

In this embodiment the distributor member executes an oscillating and rotating movement such that slag can be removed from the wall of the discharge chute in a hammering manner on rotation of the distributor. The slag is accordingly comminuted. This will prevent plugging of the system, and slag can freely fall downwardly.

A rotating slag pan can be arranged beneath the reactor shell for the removal of slag produced in reactor.

The pan is filled with a quenching liquid, for example, water, and the rims of the pan extend above the corresponding perimeter of the reactor.

In this embodiment the required airtightness is maintained, and the slag can be removed in a simple manner. This slag is also cooled by the water bath. Slag removal may be automated as required.

Since the lower portion of the tower is subjected to a greater wear it is advantageous to provide individual annular or ring segments in this region of the reactor tower. These segments can be replaced quickly and simply as required during maintenance shutdowns.

In order to increase the efficiency of the gas converter it is further advantageous that the air introduction is associated with an air preheating system. The preheating system comprises a cold air conduit, which enters in the upper wall of the reactor tower, as well as preheat channels which are in communication with the cold air conduit. Alternatively, the preheat channels are arranged in the circumferential wall of the tower. The preheating system also includes an exit-conduit for heated air, which conduit is connected to the conduit for introduction of air.

This embodiment provides in a simple manner for preheating of air and, as well, serves for cooling of the tower and the gases to be removed in the upper region of the tower.

The configuration of the preheating channels may be as desired. A very advantageous and effective configuration is, however, comprised in that the preheating channels are at least in part distributed over the circumference of the reactor tower so as to form a labyrinth of rectangular chambers. The chamber extend preferably in vertical direction.

Such an embodiment will achieve a very long preheating path in the smallest available space.

Another advantageous embodiment of the present invention resides therein that the fuel feed system, which is generally independent of the construction of the distributor member and/or the slag removal system of such gas converters, is comprised of a bucket-wheel valve arrangment, or a similar system. Instead of the intermittent or batch operation experienced in the hitherto known systems employing two gates in one valve, in accordance with the coal or coke feeding system of the present invention, the operation is substantially continuously. If desired, the operation of feeding the required volume of coke or coal may be carried out for short periods of time. The feed rate can be controlled in a simple manner such that a uniform height of the coke or coal bed is achieved. This embodiment affords a very uniform gas treatment at a very high efficiency. It will only be necessary to construct the valve of a correspondingly heat-resistant material.

A further very advantageous embodiment of the invention resides therein that in conjunction with the feed system, which is arranged in the upper portion of the tower, there is arranged a distibuting or feeder cone, which has a center which is at least substantially coincidentally arranged with respect to the longitudinal axis of the reactor tower. Several distributor channels or troughs extend in radial direction away from the center of the feeder cone. These distributor channels are of different length in each group.

The feeder cone prevents in a simple manner that during replenishing of the bed of hot fuel there is prevented the formation of a conical buildup at the center of the bed. Instead, the coal or coke is evenly distributed by the troughs of the cone into the interior of the reactor tower. Thus, the coal or coke drop down onto the bed from the ends of the troughs, which would normally be inclined outwardly and downwardly, and each one of the troughs serves to evenly distribute the coke or coal.

Further embodiments of the invention and other inventive features are contained in the claims.

DESCRIPTION OF THE DRAWINGS

In the drawings, which illustrate that which is presently regarded as the best mode of carrying out the invention.

DESCRIPTION OF THE PREFERRED EMBODIMENTS

Figure 1:
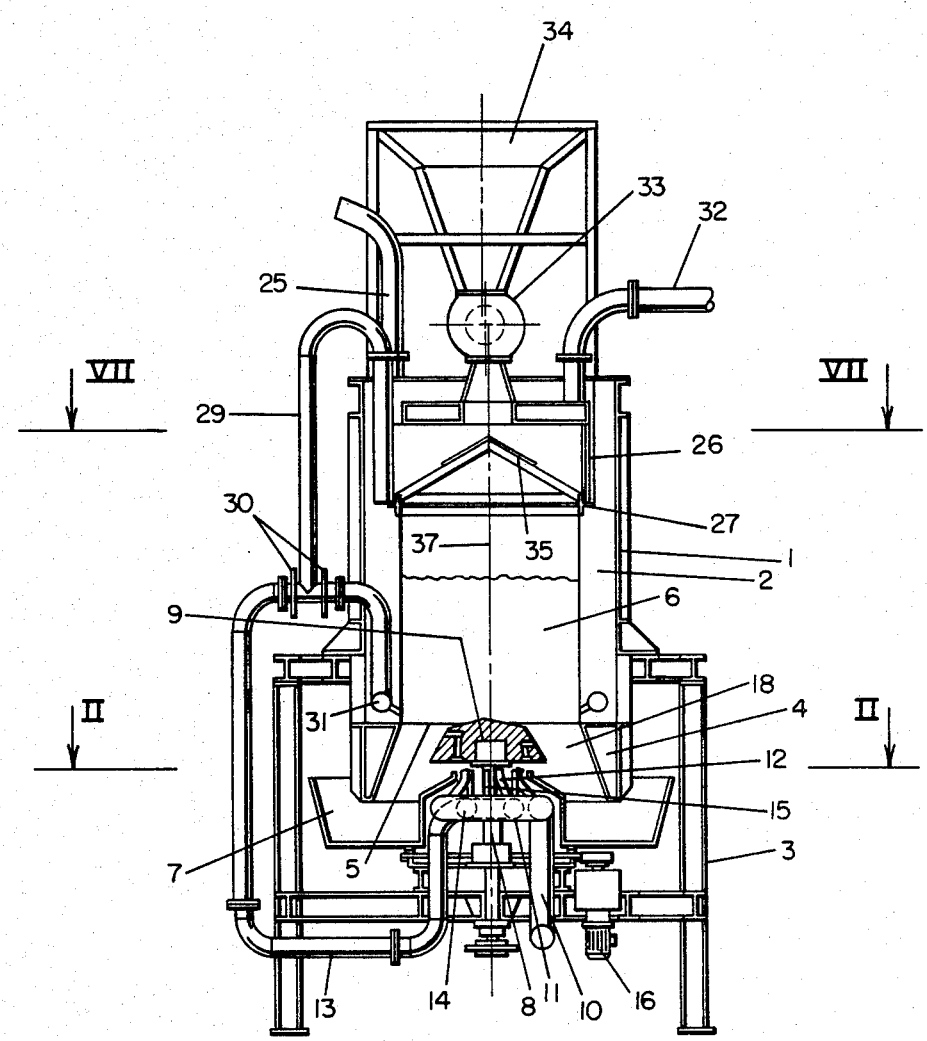
FIG. 1 is a side elevational view of a gas converter in accordance with one embodiment of the invention.

Gases to treated in the converter according to the embodiment of the invention described below, are generally produced in horizontally disposed vessels or drums, which are heated indirectly. The treatment conditions in such vessels include a temperature selected from the range of from about 400° to about 500° C., and oxygen is generally absent. The contained organic materials provide the primary feed for the production of such gases.

The treatment and dissociation of the gases is carried out in accordance with the embodiment of the converter as described in the following. Instead of the gases produced according to the process steps briefly outlined above, the scope of the present invention includes treatment of gases which are produced in a different manner, but which require further treatment over a bed of hot fuel.

The converter comprises a tower or shell, collectively also referred to as reactor or reactor tower. This is generally designated by reference numeral 1. The interior wall of the tower 1 is furnished with a brick wall or lining, designated by 2, and the tower is supported on legs 3.

The lower portion of tower 1 is provide with a plurality of ring or annular segments 4.

The reactor tower 1 is open at its lower end, but this end extends into a slag pan 7 with the ring segments 4. The slag pan is filled with a suitable liquid during the operation of the tower, to provide for slag cooling. The liquid, usually water, will be sufficient so that the level is well above the lower edges of segments 4. The circumferential rim of the slag pan 7 extends exteriorly well above the lower circumferential rim of tower 1. Thus, airtightness is ensured at the lower end of the reactor 1.

The slag pan 7 forms part of the slag removal system and it is in the shape of an annular channel. At the center of pan 7 extends a vertical drive shaft 8 for driving a distributor member, or distributor, 9. Journalling of the central shaft 8 is in an airtight manner. The slag pan 7 receives slag up to about the lower face or edge of the distributor 9. The hot fuel bed 6, usually provided by coal or coke on a suitable grate 5 is arranged above the distributor member 9.

A gas inlet conduit 10 extends to near the distributor member 9, which conduit serves to deliver gases obtained in the drum, not shown, for treatment of waste materials. The gas delivery, or inlet, conduit 10 terminates in an outer annulus or manifold 11 which has several outlet conduits 12 arranged about its circumference. These outlet conduits 12 terminate closely beneath the distributor member 9.

Figure 2:
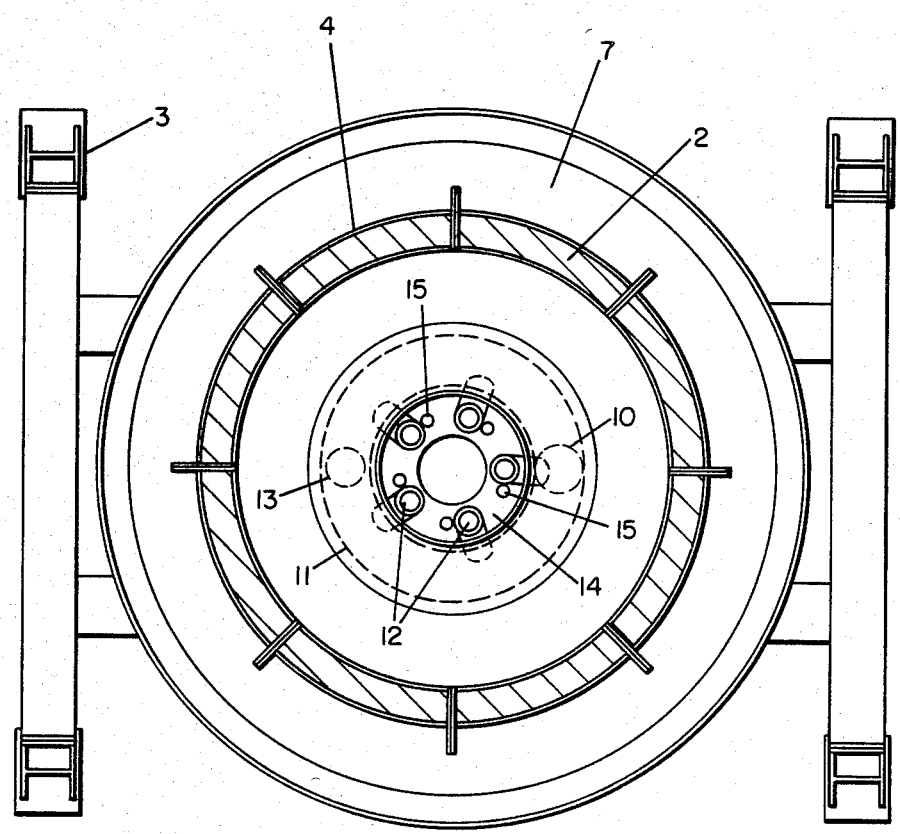
FIG. 2 is a top-plan sectional view along line II—II in FIG. 1 drawn in a larger scale.
Figure 3:
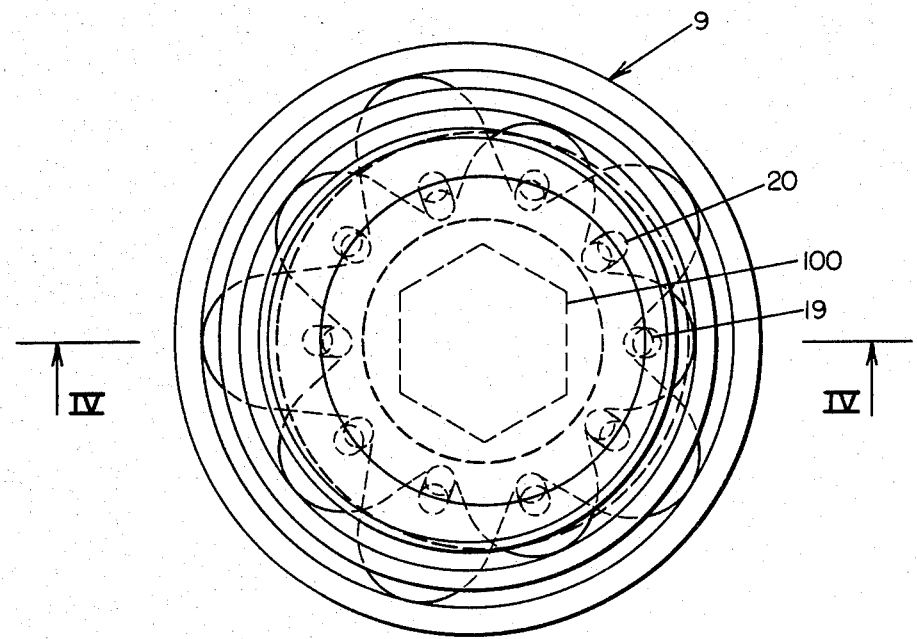
FIG. 3 is a plan view of the distributor member.

Air is introduced through the delivery, or inlet, conduit 13 which brings the air to a corresponding inner annulus or manifold 14, most clearly shown in FIG. 2. The inner manifold 14 is furnished with outlet conduits 15 which also terminates closely beneath the distributor member 9. The conduits 12 and 15 are preferably positioned in a direct relation with respect to one another.

The configuration of the air and gas delivery means and of the distributor member 9 is more clearly shown in FIGS. 2-6.

A motor 16 serves to rotate the slag pan 7, while a separate drive, not shown, serves to rotate the distributor member 9.

Figure 4:
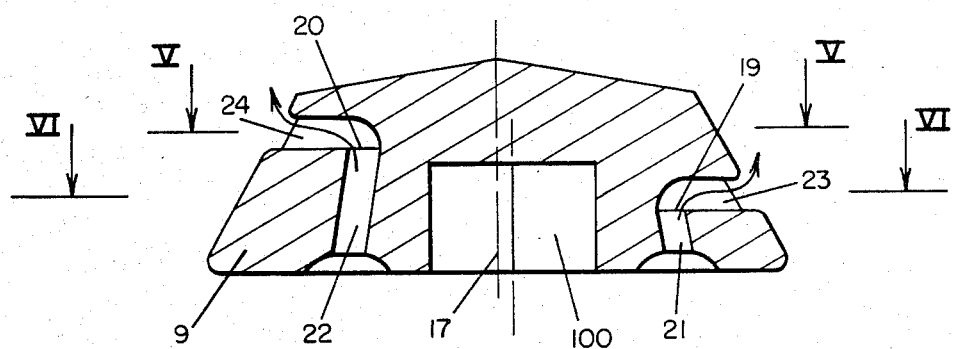
FIG. 4 is a cross section along line IV—IV in FIG. 3.
Figure 5:
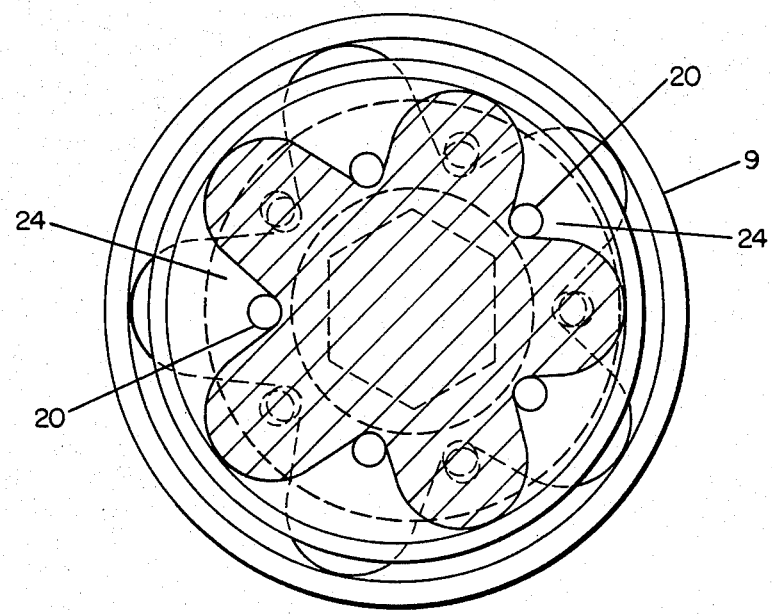
FIG. 5 is a cross section along line V—V in FIG. 4.
Figure 6:
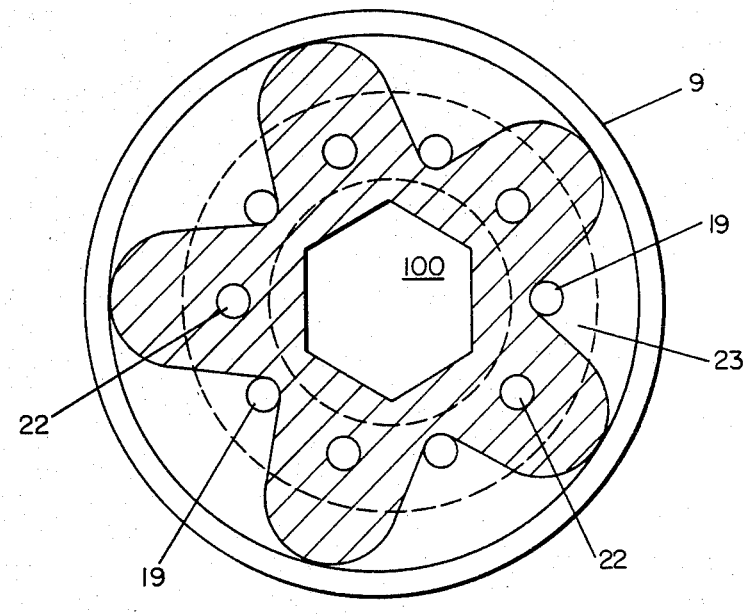
FIG. 6 is a cross section through the distributor member along line VI—VI in FIG. 4.

The distributor member 9 is made of a ceramic material and has a symmetrical configuration, which is reduced in diameter in upwardly direction, see FIG. 4. The distributor 9 is furnished with a hexagonal bore 100 in its bottom face. This bore is slightly offset with respect to the central axis 17 of the distributor 9. Accordingly, the distributor 9 will execute an oscillating movement on being rotated by its drive. This will create an annular gap or space 18 between its perimeter and the adjacent wall of tower 1 formed by the ring segments 4. The gap serves as a discharge chute for the slag which is passed from coke bed 6 in a downwardly direction. The slag is comminuted in this changing gap by the hammer motion of the member 9 and can freely drop into the liquid in slag pan 7.

The distributor 9 is furnished with a plurality of air/gas mixture exit openings 19 and 20 which are alternatingly distributed about the circumference of distributor 9. As viewed in FIG. 4, the openings are arranged such that the openings 19 are closer to the bottom face of member 9 than the openings 20. The openings 19 and 20, accordingly, can be said to form rows, with the row of openings 19 being below the row with openings 20. Slightly vertically inclined connecting bores 21 and 22 connect the openings 19 and 20 with the bottom face of the distributor 9. The air/gas mixture formed from the discharges from conduits 12 and 15 is passed through the connecting bores 21 and 22 which are slightly inclined with respect to axis 17, and the mixture leaves the distributor through the openings 19 and 20 which communicate with outwardly flaired openings 23 and 24, respectively. As is particularly evident from FIGS. 5 and 6, the distributor 9 has a star-like configuration in the region of the air/gas openings 19 and 20, respectively.

This particular configuration of the distributor 9, in conjunction with the gas and air delivery conduits 10 and 13, and the outlet conduits 12 and 15 of the manifolds 11 and 14, provides an optimal distribution of the air/gas mixture in the tower 1.

A portion of the air/gas mixture formed at the upper ends of the outlet conduits 12 and 15 flows laterally beneath and alongside the distributor 9 and then vertically through annular gap 15 into fuel bed 6. Another part will flow out from the openings 23, and a further portion will flow from the apertures 24.

Introduction of air into the system is through the inlet, or air delivery, conduit 13, via a preheating arrangement which includes a cold air conduit 25. Conduit 25 enters the system in the upper combustion region and into the wall of tower 1. The preheating arrangement is more clearly depicted in FIGS. 7 and 8. The conduit 25 leads to a plurality of preheat channels 26, formed by baffles 26a, which form a labyrinth and are distributed about the circumferential wall of the tower 1. The preheat channels 26, accordingly, form vertically extending chambers, which are alternatingly furnished at their upper or lower sides with annular sheet metal walls 27 and 28, respectively. Sheet metal walls corresponding to walls 27 and 28 are also arranged on the interior circumferential wall of the tower 1. Cold air introduced in the direction of the arrow in FIG. 8 by the conduit 25 can be passed through the channels or chambers 26 and is heated during its travel through the full circumference of tower 1 to a considerable degree, before being passed through the heated air outlet conduit 29 to the conduit 13. For improved control of the gas converter, particularly during the preheat phase, there may be provided in the heated air exit conduit 29 a branch line having valves 30, not shown in detail, so that, as required, air can be added through the large diameter manifold 31 (FIG. 1) directly laterally into the coke bed 6.

A gas removal or withdrawal conduit 32 is provided in the upper portion of the tower 1. In that area there is further provided a bucket-wheel valve 33, or a similar multiple-chamber valve which ensures airtightness with respect to the reactor tower 1. A coke or coal storage 34 having a conical configuration is arranged above the valve or gate 33. The valve 33 serves to introduce the desired quantity of coke into the interior of the tower 1 while maintaining airtightness with respect thereto.

A feeder or feeder cone, or fan, 35 is also arranged in the upper portion of the reactor tower 1. This feeder 35 is arranged somewhat beneath the valve 33 and is of conical configuration as can best be seen in FIG. 1.

Figure 7:
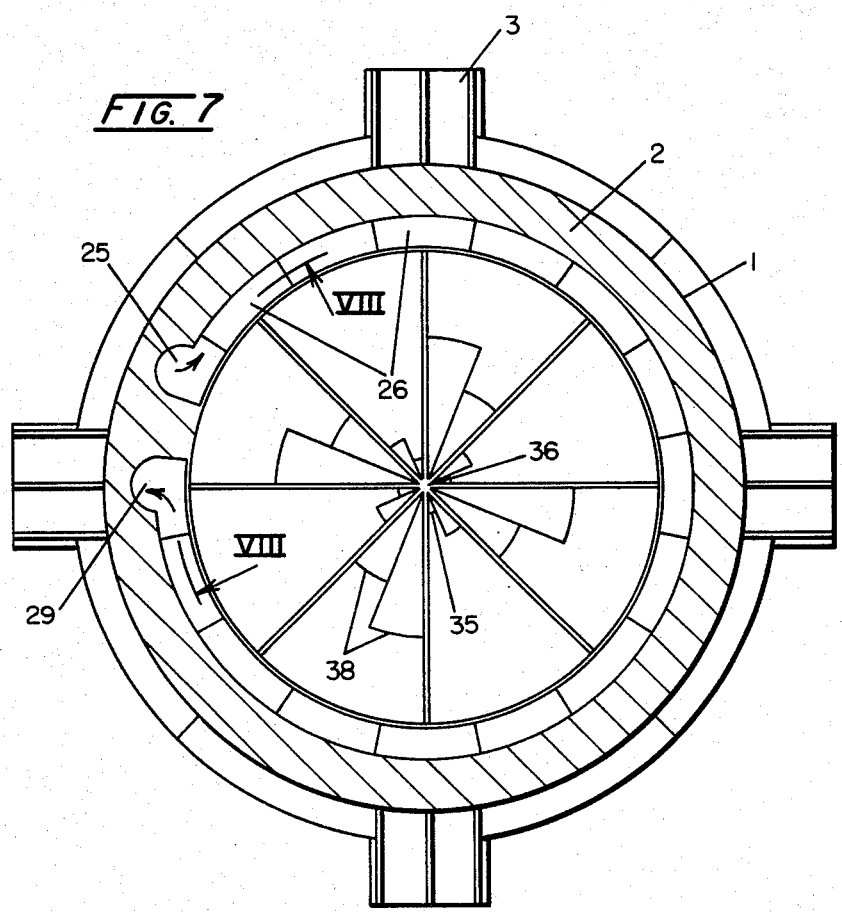
FIG. 7 is a cross section along line VII—VII in FIG. 1 of the upper portion of the reactor tower.
Figure 8:
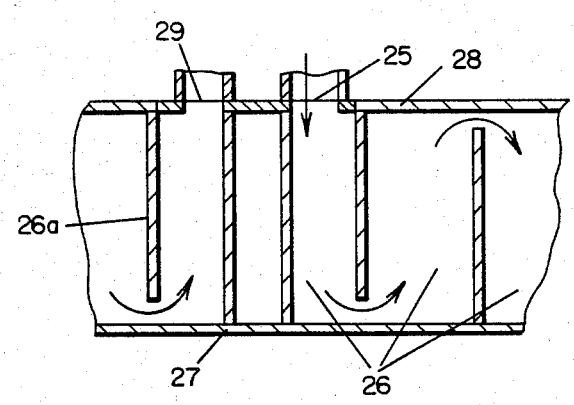
FIG. 8 is a partial sectional view of the preheater chambers, taken along line VIII—VIII in FIG. 7.

With reference to FIG. 7, the feeder 35 has a center 36 which extends generally coincidentally with respect to the longitudinal axis 37 of tower 1. Feed channels or troughs 38 radiate from the center 36 to the outer perimeter, and adjacent feed channels are distinct in length. This means that coke introduced into the system via the valve 33 is dropped onto the feeder 35 and is then dropped in conformity with the length of the pertaining channel 38 onto the coke bed 6. The bed 6 is accordingly evenly replenished, and the height is readily maintained at a constant level as desired.

Reference in this disclosure to details of the specific embodiments is not intended to restrict the scope of the appended claims, which themselves recite those features regarded as essential to the invention.

I claim:

1. A gas converter for subjecting a reactant gas produced by any of various thermal reactions, such as the pyrolysis of waste materials, to a high temperature cracking or dissociation reaction which comprises: a vertical, tubular reactor; means at the upper end of said reactor for introducing a particulate solid fuel; grate means at the lower end of said reactor for supporting a column of said fuel; an open-top annular slag pan positioned at the lower end of said reactor beneath said grate for receiving slag produced by the combustion of said solid fuel; a distributor member cooperating with the wall of said reactor to form an annulus through which slag can pass downwardly into said slag pan; means for introducing combustion supporting air and reactant gas to said reactor to an area adjacent the underside of said distributor member, said distributor member serving to direct a mixture thereof outwardly towards said annulus through which it passes upwardly into said solid fuel column; and means at the upper end of said reactor for discharging gaseous reaction products formed by the high temperature cracking of the reactant gas.

2. A gas converter according to claim 1 in which said distributor member has a plurality of air/reactant gas mixture conduits extending from its underside therethrough and exiting at the top side thereof in the form of two rows of air/reactant gas mixture exit openings, said rows being arranged one above the other with the lower row of openings being closer to the reactor wall than the top row of openings.

3. A gas converter according to claim 1 in which separate air and reactant gas conduits extend through the central openings of said annular slag pan with their discharge ends adjacent the underside of said distributor member.

4. A gas converter according to claim 1 in which a drive shaft extends through the central opening of said annular slag pan for rotating said distributor member.

5. A gas converter according to claim 2 wherein said air/reactant gas mixture exit openings are flared at the outer perimeter of said distributor member such that said distributor member has substantially a star-like configuration when viewed in cross section.

6. A gas converter according to claim 4 wherein said drive shaft is eccentrically arranged with respect to the center of said distributor member.

7. A gas converter according to claim 6 wherein the longitudinal axis of said drive shaft is coaxially with the longitudinal axis of said reactor tower.

8. A gas converter according to claim 1 wherein said slag pan is adapted for receiving cooling fluid, and has a circumferentially raised rim portion which effectively extends above the lower rim of said reactor wall.

9. A gas converter according to claim 8 wherein said lower rim of said reactor wall comprises a plurality of replaceable annular segments.

10. A gas converter according to claim 3 wherein said air conduit is connected to a preheating means including a cold air conduit entering the upper end of said reactor and communicating with preheat channels arranged in or at the reactor wall which, in turn, communicate with a heated air outlet conduit for passing heated air to said air conduit.

11. A gas converter according to claim 10 wherein said preheat channels are provided with vertically disposed chambers, said chambers forming a labyrinth about the circumference of said reactor.

12. A gas converter according to claim 1 wherein said solid fuel introducing means includes a conical feeder arranged beneath a bucket-wheel valve in the interior of said reactor the center of which is located along the londitudinal axis of said reactor, said feeder including a plurality of feed channels of different longitudinal extent when measured from said center.

13. A gas converter according to claim 3 wherein each of said air and reactant gas conduits communicates with each of which includes upwardly directed outlet conduits terminating beneath said distributor member.

* * * * *